United States Patent

[11] 3,624,283

| [72] | Inventor | David J. Logan<br>Glastonbury, Conn. |
|---|---|---|
| [21] | Appl. No. | 32,888 |
| [22] | Filed | Apr. 29, 1970 |
| [45] | Patented | Nov. 30, 1971 |
| [73] | Assignee | The Gerber Scientific Instrument Company<br>South Windsor, Conn. |

[54] METHOD AND MEANS FOR BACKSPACING A LINE FOLLOWER IN A DIGITIZING SYSTEM
10 Claims, 6 Drawing Figs.

[52] U.S. Cl. .................................................. 178/6.8, 178/DIG. 1
[51] Int. Cl. .................................................. H04n 7/02
[50] Field of Search ....................................... 250/202; 178/6.8, 6, DIG. 1

[56] References Cited
UNITED STATES PATENTS
3,073,962  1/1963  Neander et al. ............... 250/202
3,529,084  9/1970  Rich ............................. 178/6.8

Primary Examiner—Robert L. Griffin
Assistant Examiner—Barry L. Leibowitz
Attorney—McCormick, Paulding & Huber ABSTRACT: In a digitizing system, a line follower automatically follows a line or edge to be digitized and intermittently outputs data representing the coordinates of points spaced along the line. This coordinate information is supplied to a computer and, through the computer, to a recorder or other terminal device using such information. The computer memory temporarily stores, in a pushdown list, a plurality of the most recent sets of coordinate data supplied by the line follower. Should the line follower accidentally stray from the line being digitized, the operator, by appropriately conditioning the system, may cause the system to utilize the temporarily stored coordinate data to cause the line follower to be driven in a plotting or backspacing mode to retract its path of movement for return to a previously properly taken point on the line being digitized. Any erroneous coordinate data taken during the departure of the line follower from the line being digitized is erased or destroyed during the backspacing operation so that after the full digitizing operation is completed, the result is a clean record wherein the recorded data represents points located in succession along the digitized line without any "switch-backs" or undesirably large gaps in such data.

PATENTED NOV 30 1971 3,624,283

INVENTOR
DAVID J. LOGAN

By McCormick, Paulding & Huber

Attorneys

METHOD AND MEANS FOR BACKSPACING A LINE FOLLOWER IN A DIGITIZING SYSTEM

BACKGROUND OF THE INVENTION

This invention relates to automatic-digitizing systems utilizing an automatically controlled line follower for following a line or edge being digitized, and deals more particularly with such a system including a means under the control of an operator for readily returning the line follower to a previously taken point on the line being digitized should it accidentally stray from such line, and for erasing any erroneous coordinate data taken during such departure. It also deals with a method for operating a line follower to achieve backspacing of the foregoing character.

An automatically controlled line follower of the type with which this invention is concerned is one having a sensing head or device movable in two orthogonal coordinate directions so as to be capable of moving along a line or an edge on an associated sheet of paper, pattern or the like. The sensing device by optical or other means detects the line or edge to be followed and produces output signals used by a controller to energize associated motors to drive the sensing device in such a manner as to cause it to move along the line. Encoders connected with the sensing device produce data representing the two instantaneous coordinates of the sensing device, and are interrogated intermittently to provide to the remainder of the system coordinate data representing points spaced along the line being followed. In its actual construction and operation, the line follower may take various different forms without departing from the invention. One suitable construction of a line follower is shown in pending U.S. Pat. application Ser. No. 631,249, filed Apr. 17, 1967 and entitled "Line Follower." The specific line follower disclosed herein is taken to be similar to the one disclosed in said copending patent application and reference may be had to said application for further details of it.

Although an automatic line follower is intended to automatically follow a line being digitized, the sensing device of the follower may occasionally accidentally stray away from the line, and during the course of such stray may output erroneous coordinate data not representing any point on the line. Some of the reasons for such departure from the line may include: the occurrence of an ink blot on the line, a faded or sketchy line, the sensing device locking onto the wrong line at an intersection, or driving the sensing device too fast for the particular contour of line involved. Normally, the operation of the line follower is supervised by an operator, and preferably the operator is provided with a control console including a television screen on which is reproduced in magnified form that portion of the work surface including and surrounding the location of the sensing device. Therefore, when the sensing device does not depart from the line being followed, the operator can immediately stop its further movement, and in the past the operator, by means of a manual control, has been able to direct the sensing device back to the line being digitized.

Normally, the line follower is constructed so that it cannot output any coordinate data unless a line is sensed by the sensing device. That is, a condition for the outputting of coordinate data is the proper detection of a line, and unless a line is detected no output information is produced. Therefore, when the sensing device does accidentally stray from the line being followed, it will normally not produce any truly erroneous coordinate data during such stray unless it should happen to cross or lock onto an adjacent line or some other feature detected as a line. But if such erroneous points are detected, it is, of course, highly desirable and usually imperative that they do not appear in the final record. Also, in directing the sensing device back to the line being followed, it is highly desirable that it be returned to the line being followed in such a manner as to produce a final record containing no "switchbacks" or unusually large gaps in the recorded data. A switchback is the condition which exists when the successively recorded points are not all points which appear in forward succession along a line but instead include one or more points going in a reverse succession so that if the record is used to drive an X-, Y- plotter for example, the pen of the plotter necessarily executes a switchback maneuver as a result of such recorded information. That is, it is first moved forwardly along a line to a certain point, is then moved rearwardly a short distance, and is then again moved forwardly along the line. This maneuver not only represents a waste of plotting time but also may result in an undesirable character of the line being drawn by the plotter. On the other hand, if an unusually large gap appears in the recorded information when such recorded information is later used to reproduce the digitized line, the reproduced line in the vicinity of the gap may not accurately reflect the true character of the digitized line. For example, if the line being followed at the time of departure is a curve of relatively small radius, the coordinate information must be taken at relatively closely spaced points along such line in order for the line to be later reproduced with accuracy, and if two successive recorded points are spaced by a large gap, the reproduced line will usually consist of a straight line segment between such two points rather than a desired small radius curve.

The general object of this invention is, therefore, to provide a method and means for backspacing a line follower when the sensing device of such line follower accidentally departs from the line being digitized with the backspacing method and means being such that the sensing device is returned to the line being digitized without any switchbacks or unusually large gaps being formed in the coordinate information finally recorded on the recording device and without any possibly erroneously taken points appearing in the final record. A further object is to provide such a method and means whereby the backspacing is readily accomplished with very little exercise of manual control on the part of the operator being required.

SUMMARY OF THE INVENTION

This invention resides in an automatic-digitizing system utilizing an automatically controlled line follower for following a line or edge to be digitized. The line follower includes a sensing head or device for detecting the line or edge being followed and for producing, as a result of such detection, signals which are used by an associated controller to energize associated drive motors to normally cause the sensing device to be driven along the line or edge being digitized. Two encoders include in the line follower provide output signals representing the coordinates of points along the line or edge being followed and these signals are transmitted to a computer. The computer includes a memory programmed to provide a pushdown list in which the coordinates of a plurality of the most recently taken points of the digitized line are temporarily stored. When a set of coordinate data representing one point reaches the bottom of the pushdown list it is transmitted to an associated recorder or other output terminal device. In addition to a controller for energizing the drive motors to drive the sensing device along the digitized line in response to the signals produced from such sensing device, the line follower also has associated therewith another controller which in response to coordinate information representing a given point, is operable to energize the drive motors to drive the sensing device to such point. By means of a switch in an operator's console the line follower may be switched from a line following operation under control of the line following controller to a plotting or backspacing mode under control of the plotting control. When operable in the back spacing mode, coordinate data is supplied to the plotting control from the top of the pushdown list so that as each such set of coordinate data is utilized the sensing device is moved to the point represented by such data in a backspace fashion to retrace its previous path of movement. A backspace button manipulated by the operator at the console enables the sensing device to be backspaced one point at a time and as each set of coordinate data is taken from the pushdown list to operate the plotting control such coordinate information is erased from the memory and, therefore, does not appear in the final record.

DETAILED DESCRIPTION OF THE PREFERRED EMBODIMENT

Figure 1:
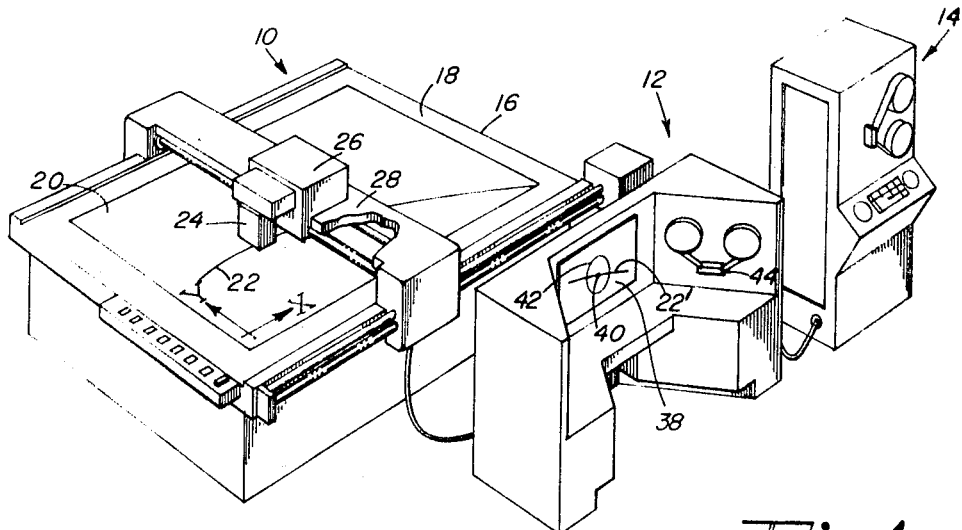
FIG. 1 is a perspective view of an automatic digitizing system embodying the present invention.

Referring to FIG. 1, this figure shows the principal hardware components of an automatic digitizing system embodying the present invention. This system, as shown, consists of a line follower 10, a control console 12 and a computer 14. The line follower 10 comprises a table 16 having a planar surface 18 on which may be supported, in flat condition, a sheet of paper 20 or other workpiece bearing one or more lines or edges to be digitized, one such line being shown by way of example at 22. It also includes a sensing device 24, preferably in the form of an optical scanning unit, for detecting the line 22 to be digitized and for producing output signals, referred to as scan data, which may be used to drive the sensing device along the line. The sensing device 24 is mounted on a supporting carriage 26 movable in the illustrated Y coordinate direction relative to another main carriage 28 which straddles the table 16 and is movable in the illustrated X-coordinate direction relative thereto. Suitable motors drive the main carriage 28 in the X-coordinate direction and the work carriage 26 in the Y-coordinate direction. These two motors are illustrated as stepping motors 30 and 32 in FIG. 6 and are, during operation of the line follower in a line following mode, controlled by an associated line following control, indicated at 34 in FIG. 6, in response to the scan data produced by the sensing device 24 to cause the sensing device 24 to follow the line 22.

Figure 6:
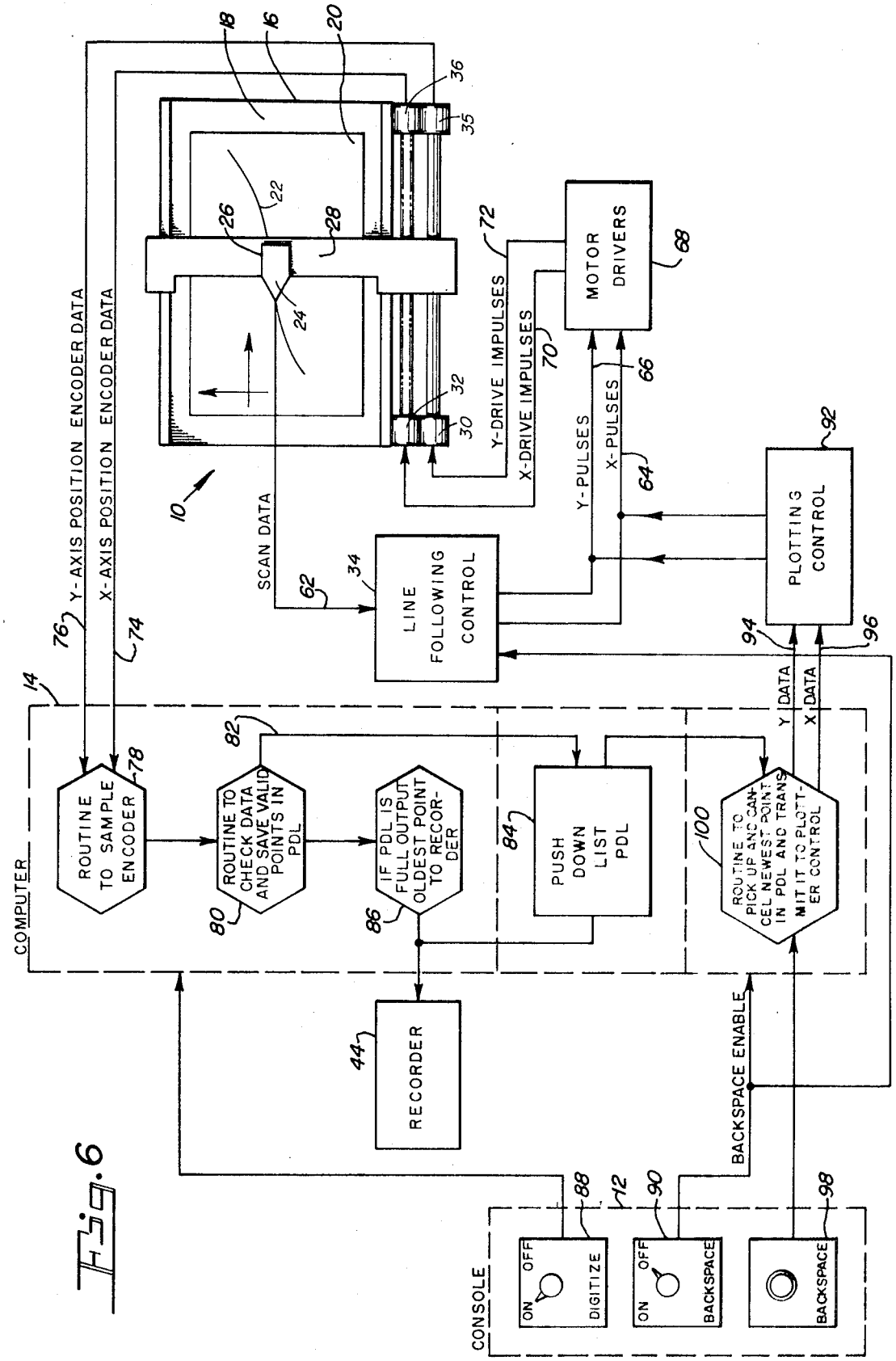
FIG. 6 is a schematic diagram further illustrating the automatic digitizing system of FIG. 1.

Also included in the line follower 10 are two encoders, indicated at 35 and 36 in FIG. 6, which supply signals or coded representations indicative of the instantaneous location, or X- and Y-coordinates, of the sensing device 24. Therefore, when the sensing device is properly registered with the line 22, the data provided by the encoders 35 and 36 represent the coordinates of a point on the line 22. As indicated previously, the line follower 10 is similar to the one disclosed in U.S. Pat. No. 3,529,084 to which reference may be made for further details of it. As mentioned above and hereinafter further described, the operation of the line follower is such that an enabling signal for accepting information from the encoders 35 and 36 is produced only when a line is detected by the sensing device 24. That is, only when the sensing device is properly registered with the line is it possible for the computer to accept information from the encoders and, therefore, when such data is accepted it validly represents a point on the line being digitized.

The line following control 34 shown in FIG. 6 is similar to the control system shown in the aforesaid patent and may be located either in the control console 12, in its own cabinet, or in the cabinet of the computer 14. The computer 14 may be either a general purpose stored program computer or a special purpose computer designed particularly for use in the illustrated system. In any event, it is one including a memory and capable of performing the functions illustrated and hereinafter described in more detail in FIG. 6.

The control console 12 includes various controls for manually controlling the operation of the line follower 10 and among other things includes a television screen 38, comprising part of a closed-circuit-television system between the sensing device and the console, on which is reproduced in magnified form a reproduction of that area of the workpiece 20 surrounding the target point of the sensing device 24. On the illustrated television screen 38, the reproduced target point of the sensing device 24 is indicated at 40 and its associated concentric scanning circle is indicated at 42. The reproduced portion of the line 22 is indicated at 22'. Therefore, it will be obvious that the operator by viewing the television screen 38 will be readily able to detect any departure of the target point 40 from the line 22 being followed and will be able to take immediate corrective action when such departure occurs.

Also, the illustrated console 12 includes a recording device for recording the output information supplied by the line follower 10, this output information consisting of coded representatives of the location of points spaced along the line being digitized. This recording device may take various different forms but by way of example in the illustrated case is shown as being a paper tape perforator 44. The tape produced by the perforator 44 may thereafter be used, for example, by any X-Y-plotting system to draw a reproduction of the digitized line, but of course, the recorded information is not limited to this use and may be put to many other and varied uses. Also, of course, the recording device need not be part of the console 12 and may, if desired, constitute a separate unit. Still further, the output information from the line follower 10 need not necessarily be utilized by a recording device and may, if desired, instead be used by another mechanism operating online from such information.

Figure 2:
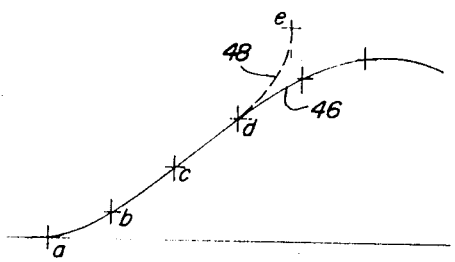
FIG. 2 is diagram illustrating the path of the scanning device of FIG. 1 as it departs from the line being digitized.

Turning now to FIGS. 2, 3, 4, and 5, the first considering FIG. 2, this figure illustrates a line 46 which may be digitized by the system of FIG. 1 with the path of the scanning device being indicated by the various points shown thereon. During the course of the digitizing of the line 46, the sensing device 24 of the digitizing system travels along the line 46 from the point $a$ to the point $b$, to the point $c$, and to the point $d$. All of these points are points located on the line 46 and are points which are "taken" and used by the remainder of the system. That is, coded representations of the points $a$ to $d$ are taken from the X- and Y-encoders 35 and 36 and are used by the remainder of the system in the manner hereinafter described. At or near the point $d$, the path of the sensing device is shown to accidentally depart from the line 46 and to travel along an erroneous path indicated by the broken line 48. When the operator detects the departure of the sensing device from the line 46 he, by manipulating a switch at the console 12, terminates further line following operation of the line follower. In FIG. 2, the point at which the sensing device is located at the time of such termination of the line following operation is represented by the point $e$. As mentioned previously, the line follower 10 is preferably of a type which is constructed so as to be unable to output coded representations of points on the line being digitized except when the sensing device is properly aligned with the line, and therefore, the point $e$ and other points along the erroneous path 48 are usually not taken. Nevertheless, in order to properly proceed with the digitizing of the line 46 the sensing device must be moved from the point $e$ to bring its target point back into registry with the line 46.

In the past, this return of the target point of the sensing device to the line being digitized has been effected by manipulating of a manual steering control at the console 12 for manually steering the sensing device back to the line. However, the operator is aware of only the present location of the target point of the sensing device and cannot determine precisely the point at which it departed from the line being digitized. Therefore, in previously returning the target point to the line being digitized, the return path has often been such as to cause either a switchback or a large gap in the output data.

Figure 3:
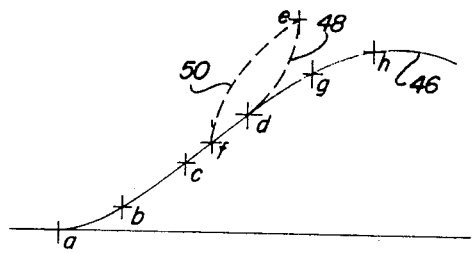
FIG. 3 is a view similar to FIG. 2 but additionally shows a path followed by the sensing device in being returned to the line being digitized with such return path in accordance with prior art practice producing a switchback in the finally recorded data.

FIG. 3, for example, shows a return path producing a switchback in the recorded data. In referring to this figure, the broken line 50 indicates the path followed by the target point in returning to the line 46. From inspection of this figure, it will be noted that the target point returns to the line 46 at the point $f$ which is located rearwardly relative to the previously taken point $d$. After the target point is returned to the point $f$ on the line 46 the point $f$ is taken and the target point is thereafter moved forwardly again in its line following procedure to the points $g$ and $h$ and other points therebeyond. Therefore, the points finally recorded or otherwise outputted from the system are outputted in the order $a, b, c, d, f, g, h$ and when these recorded points are thereafter used to drive a plotting device or other equipment the plotting device is caused to move forwardly from the point $a$ to the point $d$, to move rearwardly from the point $d$ to the point $f$, and thereafter again to move forwardly from the point $f$ to the points $g$ and $h$, rather than to move continuously forwardly as desired.

Figure 4:
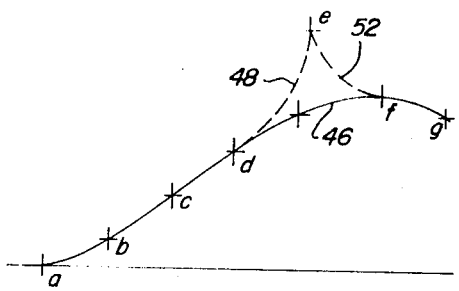
FIG. 4 is a view similar to FIG. 2 but additionally shows a path followed by the sensing device in being returned to the line being digitized which return path in accordance with prior art practice produces a gap in the finally recorded data.

FIG. 4 illustrates the movement of the target point of the sensing device along a return path 52 which causes an undesirably large gap between successively recorded or outputted points. More particularly, in FIG. 4 the next taken point along the line 46 following the point $d$ is the point $f$ which is located an unusually large distance from the point $d$ with the result that if the line 46 is thereafter reproduced by utilizing the recorded positional information describing the points $a, b, c, d, f$ and $g$, the reproduced line will most likely not accurately reproduce the original line between the points $d$ and $f$.

Figure 5:
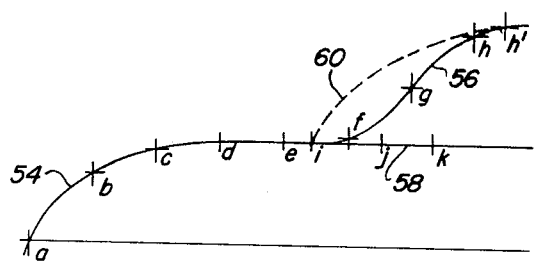
FIG. 5 is a view showing the path of the sensing device of the line follower in a situation where it accidentally follows the wrong line at an intersection.

FIG. 5 represents the path of movement of the target point of the sensing device 24 along a line 54 which at the point $i$ intersects with two other lines 56 and 58. In this case, it is assumed that it is desired at the point $i$ to proceed from the line 54 to the line 58 rather than the line 56, but the sensing device initially erroneously follows the line 56 rather than the line 58 after passing the point $i$. The points $a, b, c, d,$ and $e$ represent points taken along the line 54 as the target point proceeds toward the intersection point $i$. The points $f, g$ and $h$ represent points taken along the line 56 as the target point of the sensing device erroneously proceeds along such line. The point $h'$ represents the point at which the operator stops the line following operation after detecting the erroneous travel of the target point along the line 56. In the past, the return of the target point to the proper line 58 has generally been accomplished by manually steering the sensing device along a path, such as indicated by the broken line 60, to the point $i$, or some other point near the point $i$, and by thereafter returning the system to its line following mode of operation and, by manually operated devices, urging the sensing device to follow the desired line 58 thereafter proceeding along line 58 taking the points $j$ and $k$. From the foregoing, it will be understood that the points $f, g$ and $h$ are erroneously taken before the sensing device is returned to the desired line 58, and it is highly desirable that such points do not appear in the final record or output from the digitizer. In prior digitizing systems, the removal of such erroneously taken points, has however, been difficult if not impossible to achieve.

Turning now to FIG. 6, this figure shows in more detail, and in schematic form, the construction of the digitizing system of FIG. 1 which operates to overcome the problems inherent in prior digitizing systems as explained above in connection with FIGS. 2, 3, 4 and 5. As shown in FIG. 6, the scan data derived from the sensing device 24 is supplied to the line following control 34 over the line 62 and is utilized, when operating the system in a line following mode, by the line following control 34 to automatically drive the sensing device 24 along the line 22 being digitized. More particularly, in response to the scan data appearing on the line 62, the line following control produces X- and Y-pulses appearing on the lines 64 and 66 respectively, which control motor drives, indicated generally at 68, for controlling the energization of the X- and Y-stepping motors 30 and 32, the motor drivers 68 producing X-drive output pulses on the line 70 and Y drive output pulses on the line 72. As the sensing device 24 is driven along the line 22 being digitized coded data representing the instantaneous position of the sensing device is supplied to the computer 14 over the lines 74 and 76 from the encoders 35 and 36.

The computer 14 is in turn programmed or otherwise arranged to perform the various functions and operations indicated by the flow diagram contained within the broken line box representing the computer in FIG. 6. More particularly, for operation of the system in the line following mode, the computer includes a means for performing a given routine 78 for sampling the encoders 35 and 36. The routine 78 is set up to intermittently sample the encoders 35 and 36 so as to take points spaced from one another in succession along the path of the sensing device, and generally the routine is dependent on the relative rates of change of the data from the two encoders so that along sharply curved paths the points of sampling are located more closely to one another than they are along less sharply curved paths.

The information derived from the encoders by the sampling routine is further processed in the computer 14 by a means which performs a routing 80 for checking the sampled information against various preestablished criteria to determine whether such information represents a valid point on the line being digitized. This routine, for example, includes a check on the sensing device 24 to determine whether or not it is detecting the line at the time of sampling and for discarding the data sampled if the line is not detected. That is, if the information is found to be invalid, it is discarded. If valid, it is accepted and transmitted by the line 82 to a part of the computer memory which is arranged to provide a pushdown list 84. The pushdown list 84 is a storage means for storing in succession a given number of points, or more particularly the coded representations of such points, and after such given number of points have been stored, for outputting the oldest stored point after each new point is added thereto. For the purpose of performing this outputting, the logic portion of the computer 14 is arranged to perform another routine, indicated at 86 for determining in response to the receipt of each valid point from the routine 80 the fullness of the pushdown list 84 and to output the oldest point stored in the pushdown list if the pushdown list is found to be full. In the illustrated case, the output points outputted from the pushdown list 84 are supplied to the recorder 44, but as mentioned, they may be used for other purposes as well.

As long as the sensing device 24 remains properly aligned with the line 22 being digitized, the process described above in connection with FIG. 6 continues with each newly taken point being supplied to the top of the pushdown list 84 and being later taken from the bottom of the pushdown list, when it reaches such bottom position, for recording by the recorder 44.

When the sensing device 24 accidentally departs from the line 22 being digitized, the operator, observing the progress of the digitizing on the television screen 38 of FIG. 1, terminates the line following operation and initiates a backspacing operation to return the sensing device to a previously taken point on the line 22, with any erroneously taken points taken during the departure being erased during such backspacing. As shown in FIG. 6, the console 12 includes two manually operable switches 88 and 90 for controlling the mode of operation of the system. For operation in the line following or digitizing mode the switch 88 is set to the "on" position and the switch 90 to the "off" position. Similarly for operation in the backspacing or plotting mode the switch 88 is set to the off position and the switch 90 to the on position. Therefore, when the sensing device 24 departs from the line 22, the operator conditions the system for operation in the backspacing mode by setting the switch 88 to the off position and the switch 90 to the on position. The setting of these switches disables the line following control 34 so that it no longer operates to produce output pulses on the lines 64 and 66 in response to the scan data on the line 62, and instead a plotting control 92 is enabled to produce output pulses on the lines 64 and 66 in response to point position data supplied on its input lines 94 and 96. The position data appearing on the lines 94 and 96 consists of coded representations of points taken from the pushdown list 84 and in response to the receipt of such data the plotting control is operable to produce X- and Y-output pulses on the lines 64 and 66 as required to energize the stepping motors 30 and 32 to drive the sensing device 24 to the point represented by such coded representations. Such plotting control is well known in the art and need not be described in detail.

The console 12 further includes a manually operable backspace switch 98 which as illustrated is in the form of a pushbutton switch.

For operation of the system in the backspacing mode the computer 14 is arranged to provide another routine, indicated at 100, which is responsive to an actuation of the backspace pushbutton 98 to pick up and cancel from the pushdown list the newest point therein and to transmit such point to the plotting control 92 on the lines 94 and 96. As a result the plotting control causes the sensing device 24 to be moved to the point represented by the data taken from the pushdown list. For example, referring to FIG. 2, assume that the sensing device 24 is at the point *e* at the time the line following operation is terminated and the system switched to a backspacing mode. At this time the newest point stored in the pushdown list is the point *d*. If the backspacing switch 98 is now pushed the information concerning the point *d* is taken from the pushdown list 84, is cancelled from such list and is supplied to the plotting control 92, and the plotting control in response to this information, causes the sensing device to be driven to the point *d*. The point *c* is now the newest point in the pushdown list 84 and if the backspace button 98 is now again actuated the sensing device 24 will be moved to the point *c*. After the sensing device by this backspacing procedure has been returned to the point *b*, the point *c*, or any other point on the line 46, the system may be returned to the line following mode. As such line following operation is initiated the point initially sensed by the sensing device will be taken so that no large gaps or switchbacks are produced in the finally recorded data.

Considering FIG. 5, if the sensing device is at the point *h'* when the line following operation is terminated the data representing the point *h* is the newest in the pushdown list. Therefore when the system is turned to the backspace mode and the backspace switch 98 is first thereafter pressed the sensing device will be moved to a point *h*, the next actuation of the pushbutton switch will cause the sensing device to be moved to the point *g*, the next actuation will cause it to be moved to the point *f*, and the next actuation will cause it to be moved to the point *e*. The point *e* is a properly taken point and, therefore, after the sensing device is returned to this point the line following operation may be again initiated. In this process of returning the sensing device to the point *e* it will be noted that the previously taken points *h*, *g* and *f* are cancelled from the pushdown list so that they will never find their way to the recorder 44 and into the finally recorded data.

It will be understood from the foregoing that the system illustrated in FIGS. 1 and 6 of this application and as described above provides a highly convenient and desirable means for backspacing a line follower in a digitizing system which means overcomes previously encountered problems of producing switchbacks and large gaps in the recorded or otherwise outputted data and for omitting erroneously taken points. The line follower of the invention may be one which follows a graphic line such as drawn by a pen or other writing implement or an edge such as provided by a pattern or template. However, in the broad sense of the term "line" an edge is also a line, and in the claims which follow the term line is used in this broad sense so as to include among other things both graphic lines as drawn by a writing implement and a line formed or defined by a pattern edge.

I claim:

1. In a digitizing system the combination comprising means for supporting a workpiece on which a line to be digitized appears, a line-sensing device supported for movement relative to said supporting means so as to be movable along any line on a workpiece supported thereby, drive means for driving said sensing device relative to said supporting means, line following control means responsive to output signals from said sensing device for energizing said drive means to cause said sensing device to be driven along the line sensed thereby, encoding means connected with said sensing device for producing a coded representation of the instantaneous position of said sensing device relative to a workpiece supported on said supporting means, means operable when said drive means are energized by said line-following control means for periodically sampling said encoder means as said sensing device is driven along a line to obtain coded representations of points spaced along said line, a data storage means connected with said sampling means for storing in succession a given number of said sampled coded representations, said data storage means being operable to accept said given number of sampled coded representations and to thereafter output the oldest coded representation stored therein as each new coded representation is received, a plotting control means responsive to a coded representation extracted from said storage means for energizing said drive means to drive said sensing device to the point represented by said extracted coded representation, means under the control of an operator for selectively enabling and disabling said line-following control means, and extracting means operable when said line-following control means is disabled to extract one at a time and in the order of the newest one first at least one coded representation from said data storage means and to transmit such extracted representation to said plotting control means for use thereby.

2. The combination defined in claim 1 further characterized by said means for selectively enabling and disabling said line-following control means comprising a switch means connected with said line-following control means and said plotting control means for selectively switching said drive means from a line following mode in which it is energized by said line-following control means and a backspacing mode in which it is energized by said plotting control means.

3. The combination defined in claim 1 further characterized by said extracting means including a manually operable backspace switch, and means connected with said backspace switch and operable when said line-following control means is disabled for commanding the extraction of a new coded representation from said storage means for use by said plotting control means each time said backspace switch is actuated in a predetermined manner.

4. The combination defined in claim 1 further characterized by a recorder connected with said data storage means for recording the coded representations which are output therefrom as new coded representations are received thereby.

5. The combination defined in claim 1 further characterized by said supporting means having a planar supporting surface for supporting a workpiece in flat condition, said drive means including X- and Y-drive motors for driving said sensing device in X- and Y-coordinate directions respectively relative to said supporting surface, and said encoder means including an X-encoder for providing a coded representation of the X-coordinate position of said sensing device and a Y-encoder for providing a coded representation of the Y-coordinate position of said sensing device so that the coded representation of a given point comprises a pair of coded representations one being a representation of its X-coordinate position and the other representation of its Y-coordinate position.

6. The combination defined in claim 1 further characterized by said data storage means being part of a general purpose computer.

7. The combination defined in claim 1 further characterized by an operator's console, and a closed-circuit-television system associated with said sensing device and said operator's console for providing at the console a magnified image of that portion of the workpiece including and surrounding the location of said sensing device, said closed-circuit-television system including a television screen at said operator's console on which said image appears.

8. The method for operating an automatic line follower in a digitizing system which method comprises the steps of: conditioning an automatic line follower having a line-sensing device to automatically follow a line on a given workpiece, periodically sampling encoders connected with the line-sensing device on the line follower to derive coded representations of points spaced along the line being followed, storing in succession a given number of the most recent ones of said coded representations, after said given number of coded representations have been stored storing each new sampled coded representation and as a new sampled coded representation is so stored removing from storage and outputting the oldest stored coded representation, observing the progress of said line-sensing device, continuing the aforementioned steps until it is observed that the sensing device has departed from the line to be followed, thereafter disabling said line follower from automatically following a line on said given workpiece, extracting one at a time the newest coded representations from storage in the order of the newest one first and supplying each such extracted coded representation to a means operable to drive said line-sensing device in a backspacing manner to the point represented by such coded representation, continuing said one at a time extraction of said newest coded representations and the accompanying point to point backspacing of said sensing device until said sensing device is returned to a point on the line to be followed, and thereafter again conditioning said line follower to automatically follow said line.

9. The method for operating an automatic line follower in a digitizing system as defined in claim 8 further characterized by recording in succession each of the coded representations outputted from storage as a result of new coded representations being placed in storage.

10. The method for operating an automatic line follower in a digitizing system as defined in claim 8 wherein said step of observing the progress of said sensing device is performed by providing a closed-circuit-television system between said sensing device and a point remote therefrom for presenting on a television screen at said remote point a magnified image of that portion of the workpiece including and surrounding the location of said line-sensing device, and observing said image on said television screen.

* * * * *

PO-1050
(5/69)

UNITED STATES PATENT OFFICE
CERTIFICATE OF CORRECTION

Patent No. 3,624,283                    Dated November 30, 1971

Inventor(s) David J. Logan

It is certified that error appears in the above-identified patent and that said Letters Patent are hereby corrected as shown below:

Abstract, line 13, "retract" should be --retrace--.
Col. 1, line 33, after "Line Follower" insert --now U. S. Patent No. 3,529,084--.
Col. 1, line 54, delete "not".
Col. 1, line 74, switchback should be in quotes.
Col. 2, line 47, "include" should be --included--.
Col. 2, line 71, backspace should be in quotes.
Col. 3, line 7, after "is" insert --a--.
Col. 4, line 37, "the" should be --and--.
Col. 4, lines 67 and 68, "manipulating" should be --manipulation--.
Col. 4, line 75, switchback should be -- "switchback" --. (Hyphen is included)
Col. 5, line 71, "drives" should be --drivers--.
Col. 6, line 20, "routing" should be --routine--.

Signed and sealed this 30th day of May 1972.

(SEAL)
Attest:

EDWARD M. FLETCHER, JR.
Attesting Officer

ROBERT GOTTSCHALK
Commissioner of Patents